United States Patent [19]

Kale

[11] Patent Number: 5,421,404
[45] Date of Patent: Jun. 6, 1995

[54] STORAGE TANK FOR WATER HEATERS AND THE LIKE WITH FILLING DIP TUBE

[76] Inventor: Hemant D. Kale, 8253 Sugarland Dr., Manlius, N.Y. 13104

[21] Appl. No.: 202,898

[22] Filed: Feb. 28, 1994

[51] Int. Cl.⁶ ............................................. F28D 1/06
[52] U.S. Cl. .................................. 165/132; 126/362
[58] Field of Search ................. 126/362, 361; 165/132

[56] References Cited

U.S. PATENT DOCUMENTS

| | | | |
|---|---|---|---|
| 1,755,082 | 4/1930 | Sims | 126/362 |
| 1,944,817 | 8/1933 | Thomas | 122/19 |
| 2,311,469 | 10/1938 | Pruitt | 158/91 |
| 2,698,007 | 3/1950 | Tegler | 122/13 |
| 2,889,139 | 6/1959 | Hedberg | 165/132 |
| 3,465,123 | 9/1969 | Harris | 219/328 |
| 4,549,525 | 10/1985 | Narang | 126/361 |
| 4,735,174 | 4/1988 | Crump | 126/362 |

Primary Examiner—A. Michael Chambers
Attorney, Agent, or Firm—John C. Shepard

[57] ABSTRACT

A storage tank for water heaters and the like having a vertical, cylindrical tank, with a curved top wall, means for heating water within the tank, a cold water inlet and a hot water outlet at the top includes an inlet dip tube with means for transferring heat from the upper portion of the tank to the lower portion of the tank. The dip tube has a relatively large surface area to effect increased heat transfer between incoming water and heated tank water.

16 Claims, 2 Drawing Sheets

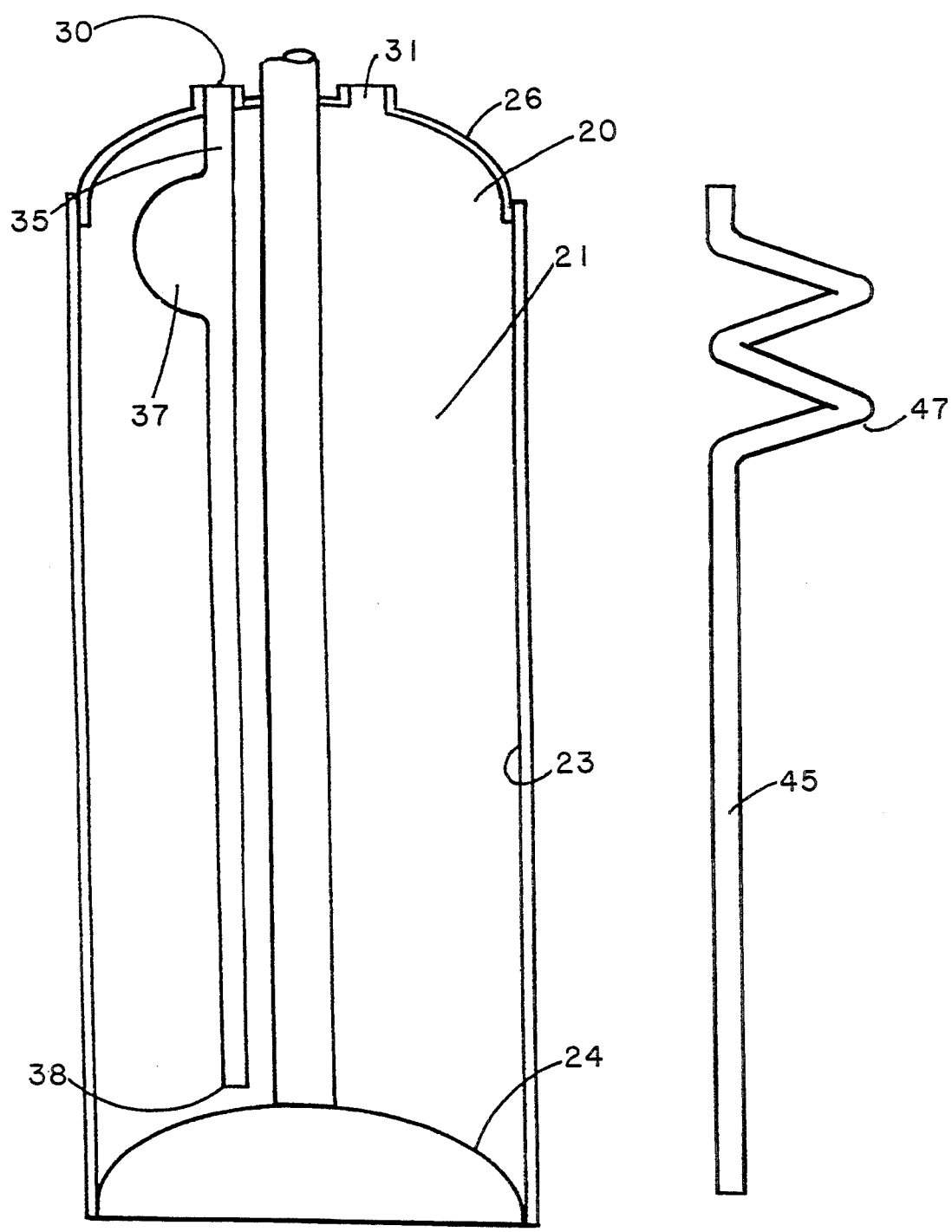
FIG. 1                    FIG. 2

STORAGE TANK FOR WATER HEATERS AND THE LIKE WITH FILLING DIP TUBE

BACKGROUND OF THE INVENTION

1. Technical Field

This invention relates generally to storage tanks for hot fluids and, more particularly, to dip tubes for hot water storage tanks such as water heaters.

2. Background Art

There has been a lingering problem commonly associated with direct-fired gas and oil water heaters having an upright storage tank in which the center gas flue is surrounded by the water stored within the tank. Frequent withdrawals of small quantities of hot water causes frequent firing of the gas/oil burner. The gas/oil burner is controlled by a thermostat located in the bottom of the tank. With each draw of hot water, the burner is turned on to heat the newly introduced cold water. At the same time, the previously heated water has moved up in the tank and gains temperature due to heat transfer from the flue. This phenomenon continues as the water rises within the tank so that the temperature of the water in the dome of the tank reaches extremely high temperature. This high temperature water may create an extreme safety risk. In addition, the safety relief valve located in the tank may be opened to drain hot water from the tank. Operation of the valve in such a manner would waste energy by draining heated water.

This phenomenon of hot water accumulating near the tank dome by the aforementioned process is sometimes referred to as "stacking". Since the thermostat is located in the bottom of the heater, the temperature of the water in the top can be dangerously high. To alleviate this problem, present water heaters use dip tubes which terminate above the bottom of the tank about one third of the way up. Some heaters use a dip tube design which partially introduces incoming cold water in the upper portion of the tank to moderate the excessively high water temperature. To accomplish this, the dip tube is provided with a hole which opens or closes in response to the temperature of the surrounding water. Both these solutions have an adverse effect on the recovery rating of the heater. The invention disclosed herein can provide a solution to the "stacking" problem without adversely affecting the recovery rate.

The shorter dip tube has a second disadvantage. It keeps the water in the tank bottom relatively stagnant. This allows the mineral sediment to settle to the bottom of the tank undisturbed. Over time, these sediments can accumulate and reduce the useful gallon capacity of the tank. Also, the sediments reduce the heat transfer from the burner to the water through the bottom. Since the tank bottom is the primary heat transfer area for the tank's burner, this reduces heat transfer efficiency which, in turn, reduces energy efficiency. This also exacerbates the stacking problem, because more heat is transferred through the stack rather than at the bottom. Accumulation of sediments in the bottom also creates severe stresses on the tank causing premature tank failure. Further, the sediments block the drain valve sometimes making it inoperative or ineffective. All of these problems can be alleviated or curtailed substantially if the dip tube is brought all the way down in the bottom and the incoming water jet is used to keep sediments in motion and in suspension so that the sediments will eventually flow out the tank.

Some water heaters have appeared on market which approach this problem in a different manner. In those heaters, the water tank is placed inside another tank which is filled with a captive liquid heating medium. The burner heat is transferred to the liquid heating medium in the outer tank, the liquid medium being kept in circulation. This liquid medium transfers heat to the water. This is extremely expensive since two tanks and an electric motor to circulate the liquid medium and its associated controls are required for operation. The circulating medium normalizes the temperature of the water thereby reducing the recovery rating.

For a moderate cost, the heat exchanger dip tube proposed here will provide a solution to the above-stated problems caused by the build up of sediments, namely, loss of heat transfer (loss of energy efficiency), reduction in the tank's original gallon capacity, and increased safety hazard.

SUMMARY OF THE INVENTION

The present invention is directed to overcoming one or more of the problems as set forth above.

According to the present invention, a conventional hot water heater having a vertical storage tank with a top wall has an inlet water dip tube with heat exchanger means to transfer excess heat from the tank storage area top to the tank storage area bottom.

Since the greater the surface area the greater the heat transfer, the heat exchanging dip tube disclosed here will provide more heat transfer area than a straight direct dip tube will provide.

Exemplary embodiments of the invention provide a heat exchanging dip tube including a reservoir, a coil, spiral, a finned tube, or combination thereof which will provide larger heat transfer area.

A feature of the invention is that the heater will be inherently non-overheating. Other features are self-cleaning, improved recovery, enduring energy efficiency, longer tank life, and maintenance of original tank gallon capacity.

An advantage of the invention is that the tank will deliver more hot water, in gallons, at a relatively high temperature. A further feature of the invention is the minimization of the mixing of hot and cold water within the tank by the simplest and least expensive means possible.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational sectional view of a first embodiment of the present invention showing the use of a dip tube constructed in accordance with the present invent i on;

FIG. 2 is a side elevational view of another embodiment of a dip tube constructed in accordance with the 10 present invention;

DESCRIPTION OF THE PREFERRED EMBODIMENTS

Figure 3:
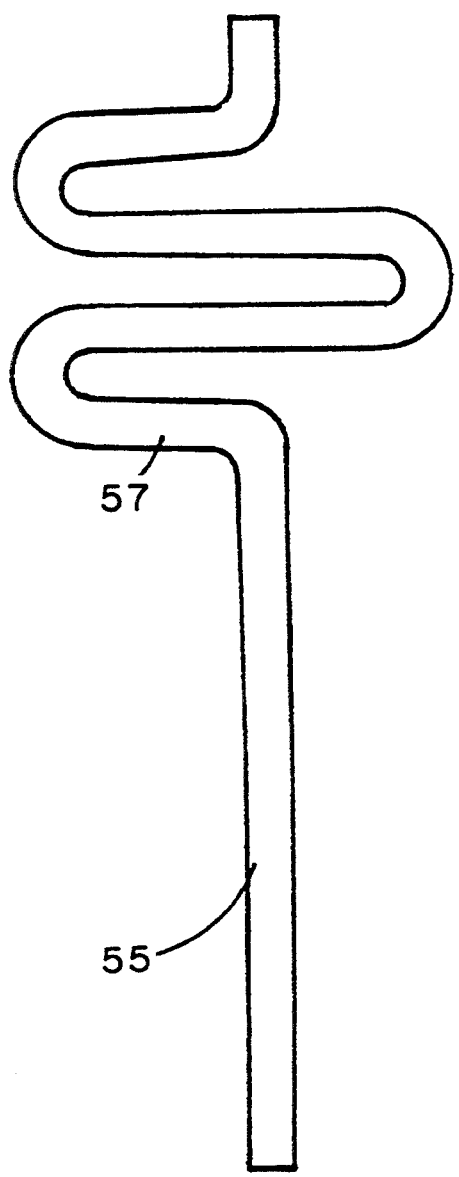
FIG. 3 is a side elevational view of another embodiment of a dip tube constructed in accordance with the present invention.

Best Modes for Carrying Out the Invention

Referring to FIG. 1 of the drawings, a conventional, non-compartmentalized hot water heater, generally designated 20, has a storage tank 21 with an upright, vertical axis. The internal hot water storage chamber of the tank 21 is defined by a cylindrical side wall 23, a bottom wall 24 and an outwardly concave top wall 26. The bottom wall 24 is located at the upstream end of the tank 21 and the top wall 26 is located at the downstream end of the tank 21. The tank 21 has a cold water inlet 30 and a hot water outlet 31 in the downstream portion of the tank 21 generally adjacent the top thereof. Both the inlet 30 and the outlet 31 are radially spaced from the tank axis. Heating means, such as the gas/oil burners or the electric heating elements are not shown. The tank 21 may also have an opening (not shown) for a temperature-pressure relief valve.

When in operation, hot water is withdrawn from the top of the tank 21 by way of the outlet 31. Cold water replacing the water withdrawn is introduced to the tank 21 by way of the inlet dip tube 35.

In a first embodiment of the invention as shown in FIG. 1, the dip tube is provided with a heat exchanging means 37, which in this embodiment is defined by a small reservoir, that provides for a large heat transfer area. The dip tube 35 is in communication with the inlet 30 and extends downward through the heated water within the tank's internal storage area. The dip tube 35 has an open end 38 in the upstream portion of the tank 21 near the bottom wall 24 for delivering water therethrough to the tank storage area. Herein, the open end 38 is shown facing the bottom wall 24 so that any sediment settling on the bottom wall 24 is flushed by the incoming water and placed in suspension within the tank.

The reservoir 37 is disposed in the upper portion of the dip tube 35 and is defined by increasing the diameter of the dip tube 35. Water flowing through the dip tube 35 and into the reservoir 37 will absorb heat from the hotter water found in the top of the tank 21 thereby reducing the temperature of the stored water. When the water exits the open end 38, it will have an increased temperature so that cold water is not introduced directly into the tank 21 without some degree of preheating. Further, the temperature of the water in the top of the tank 31 is reduced slightly.

Because the external surface area of the dip tube with a reservoir is greater than the external surface area of a straight dip tube with a constant external diameter, more heat is transferred to incoming cold water before it is introduced into the tank. While the shape and relative size of the reservoir 37 may vary, it should be understood that the external surface area of the reservoir 37 should be greater than the product to the internal circumference of the inlet 30 times the vertical distance between the inlet 30 and the open end 38 of the dip tube 35 so that the effective heat transfer area is greater than that of a typical straight dip tube of conventional design.

In FIG. 2, another embodiment of a dip tube constructed in accordance with the invention is shown. The upper portion of the dip tube 45 is coiled, the coil 47 having a spiral form and a relatively large radial diameter. Below the coil 47, the dip tube 45 straightens. The increased surface area presented by the coil 47 increases the heat exchanged between the tank water and the dip tube water. Since the spiral coil 47 extends radially across the tank in a circular fashion, the probability that rising water will come in contact with the dip tube is increased.

In FIG. 3, another embodiment of a dip tube constructed in accordance with the invention is shown. The upper portion of the dip tube 55 is bent and looped back and forth to define a wound or sinuous shape. Below the coil 57, the dip tube 55 straightens. The increased surface area presented by the coil increases the heat exchanged between the tank water and the dip tube water.

Figure 4:
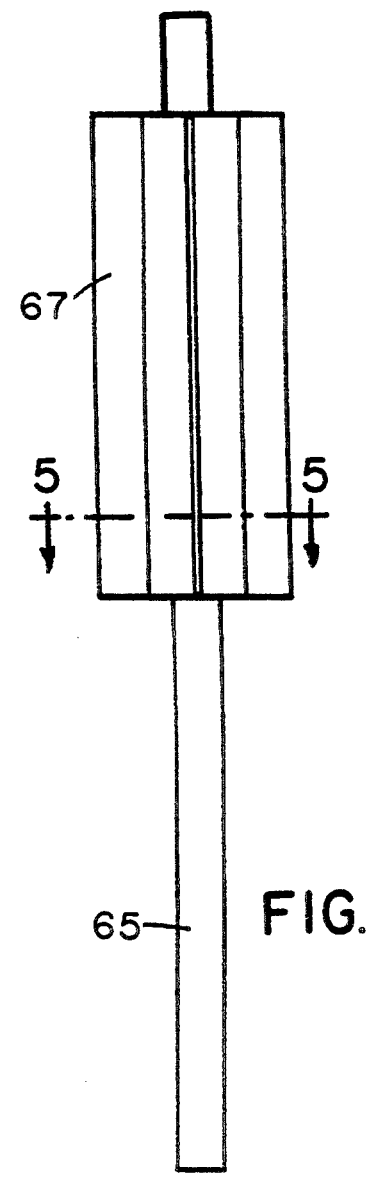
FIG. 4 is a side elevational view of another embodiment of a dip tube constructed in accordance with the present invention; and, FIG. 5 is a cross-sectional view of the dip tube taken along line 5—5 of FIG. 4.
Figure 5:
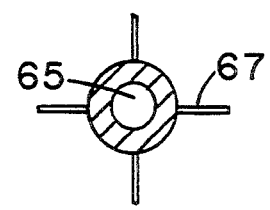

In FIGS. 4 and 5, a further embodiment of a dip tube constructed in accordance with the invention is shown. Extending radially outward from the upper portion of the dip tube 65 are a series of circumferentially spaced heat exchanging fins 67. The fins 67 extend out into the tank water and effectively increase the surface area of the dip tube and thereby increase the amount of heat exchanged.

Note that in modifications of the embodiments of the dip tubes shown, combinations of the heat exchanging methods shown herein may be employed. For example, heat exchanging fins may be used around the reservoir or formed as part of the dip tube coils.

Industrial Applicability

From the foregoing, it should be apparent that the storage tank described herein is simple and inexpensive, yet provides a convenient and reliable means for delivering more hot water from the tank outlet at a relatively higher temperature over an extended period of time.

Other aspects, objects and advantages of this invention can be obtained from a study of the drawings, the disclosure and the appended claims.

What is claimed is:

1. In a vertical storage tank having a side wall, a bottom wall and a top wall defining an internal storage area for heated fluid, the bottom wall being located at the upstream end of the tank and the top wall being located at the downstream end of the tank, an inlet in the downstream portion of the tank for introducing fluid into the tank, an outlet for withdrawing fluid from the tank, the improvement comprising a dip tube in communication with the inlet at the downstream portion of the tank, said dip tube being located entirely within the tank in direct contact with the heated tank fluid and extending through the heated fluid in the internal storage area and having an open end in the upstream portion of the tank near the bottom wall for delivering fluid therethrough to the tank and for providing counterflow heat exchange between the tank fluid and the dip tube fluid, said dip tube being configured to provide increased heat exchange within at least one predetermined level within the downstream portion of the tank, said dip tube having an external surface area greater than the area defined by the product of the internal circumference of the inlet times the vertical distance between the inlet and said open end of said dip tube, whereby heat is transferred from the fluid within the tank to the fluid in said dip tube with hotter tank fluid at the top of the tank heating cooler dip tube fluid so that when the dip tube fluid enters the tank the introduced fluid has been heated above its temperature at the inlet.

2. The storage tank of claim 1 wherein said dip tube has an enlarged cross-sectional area in the upper portion thereof.

3. The storage tank of claim 2 wherein said dip tube has a reservoir defined in the upper portion thereof to accumulate water flowing therethrough, said reservoir having a diameter greater than the diameter of said dip tube.

4. The storage tank of claim 2 wherein said dip tube is coiled over at least as portion thereof as it extends downward through the internal storage area, the coil having a radial dimension greater than the diameter of said dip tube.

5. The storage tank of claim 4 wherein said dip tube has a constant tube diameter as it extends from its upper end to its lower end.

6. The storage tank of claim 2 wherein said dip tube has a sinuous shape over at least a portion thereof as it extends downward through the internal storage area.

7. The storage tank of claim 2 wherein said dip tube includes fins extending therefrom into the heated fluid to permit heat transfer therebetween.

8. The storage tank of claim 1 wherein said dip tube has a series of circumferentially spaced fins extending radially outward therefrom into the heated fluid to permit heat transfer therebetween.

9. In a vertical storage tank having a side wall, a bottom wall and a top wall defining an internal storage area for heated fluid, the bottom wall being located at the upstream end of the tank and the top wall being located at the downstream end of the tank, an inlet in the downstream portion of the tank for introducing fluid into the tank, an outlet for withdrawing fluid from the tank, the improvement comprising a dip tube in communication with the inlet at the downstream portion of the tank, said dip tube being located entirely within the tank in direct contact with the heated tank fluid and extending through the heated fluid in the internal storage area and having an open end in the upstream portion of the tank near the bottom wall for delivering fluid therethrough to the tank and for providing counterflow heat exchange between the tank fluid and the dip tube fluid, said dip tube being configured to provide increased heat exchange within at least one predetermined level within the downstream portion of the tank, said dip tube having an internal volume greater than the volume defined by the product of the internal cross-sectional area of the inlet times the vertical distance between the inlet and said open end of said dip tube, whereby heat is transferred from the fluid within the tank to the fluid in said dip tube with hotter tank fluid at the top of the tank heating cooler dip tube fluid so that when the dip tube fluid enters the tank the introduced fluid has been heated above its temperature at the inlet.

10. The storage tank of claim 9 wherein said dip tube has an enlarged cross-sectional area in the upper portion thereof.

11. The storage tank of claim 10 wherein said dip tube has a reservoir defined in the upper portion thereof to accumulate water flowing therethrough, said reservoir having a diameter greater than the diameter of said dip tube.

12. The storage tank of claim 10 wherein said dip tube is coiled over at least a portion thereof as it extends downward through the internal storage area, the coil having a radial dimension greater than the diameter of said dip tube.

13. The storage tank of claim 12 wherein said dip tube has a constant tube diameter as it extends from its upper end to its lower end.

14. The storage tank of claim 9 wherein said dip tube has a sinuous shape over at least a portion thereof as it extends downward through the internal storage area.

15. The storage tank of claim 10 wherein said dip tube includes fins extending therefrom into the heated fluid to permit heat transfer therebetween.

16. The storage tank of claim 9 wherein said dip tube has a series of circumferentially spaced fins extending radially outward therefrom into the heated fluid to permit heat transfer therebetween.

* * * * *